No. 691,636. Patented Jan. 21, 1902.
E. S. KENNEDY.
MOLD FOR COMPO CAPS FOR MANTEL COLUMNS.
(Application filed Sept. 3, 1901.)
(No Model.)
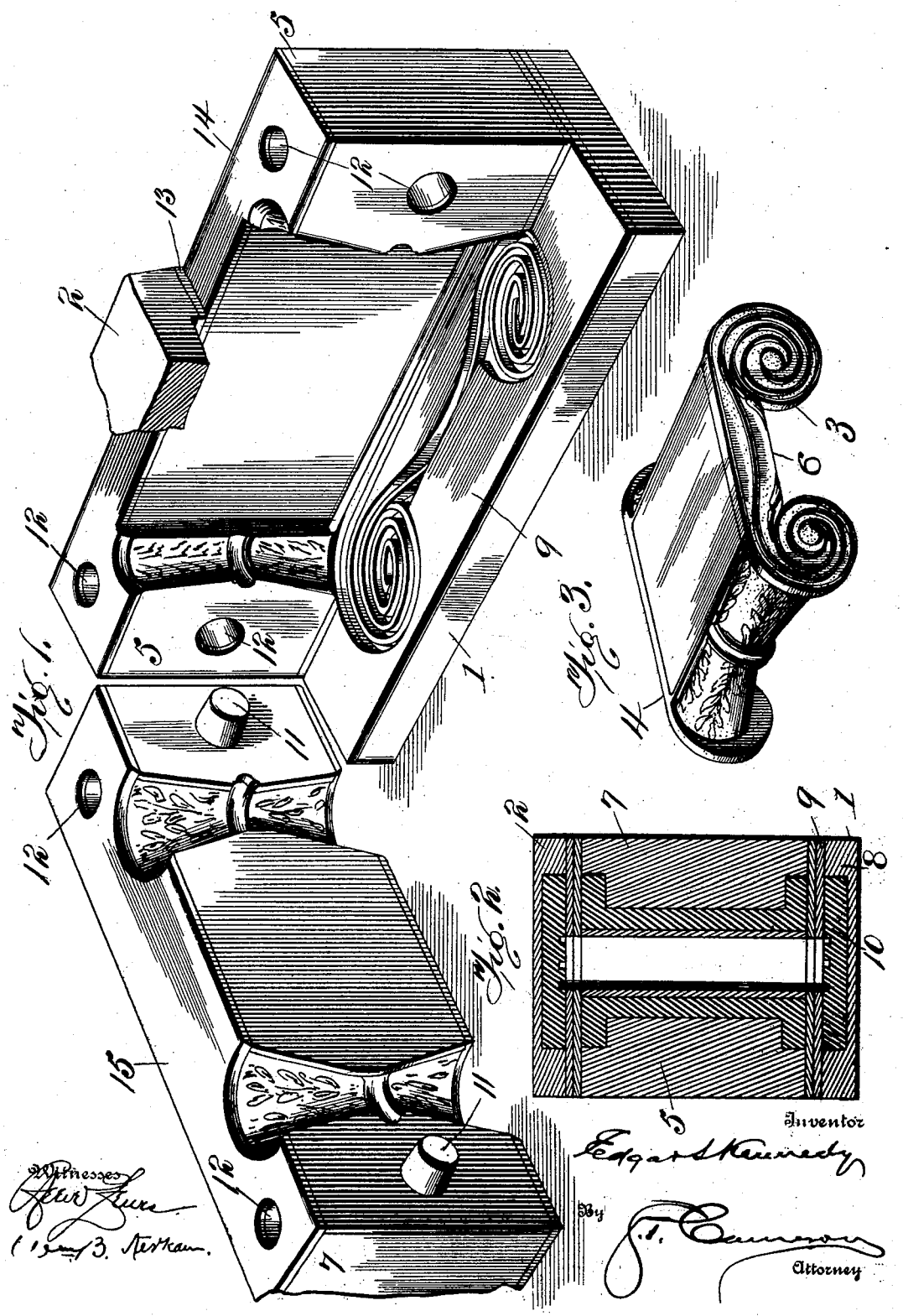

UNITED STATES PATENT OFFICE.

EDGAR S. KENNEDY, OF WASHINGTON, DISTRICT OF COLUMBIA.

MOLD FOR COMPO CAPS FOR MANTEL-COLUMNS.

SPECIFICATION forming part of Letters Patent No. 691,636, dated January 21, 1902.

Application filed September 3, 1901. Serial No. 74,249. (No model.)

*To all whom it may concern:*

Be it known that I, EDGAR S. KENNEDY, a resident of Washington, District of Columbia, have invented a new and useful Improvement in Molds for Compo Caps for Mantel-Columns, which invention is fully set forth in the following specification.

My invention relates to the art of molding in plastic materials, and more particularly to the construction of the molds employed in molding "compo" caps for mantel and other columns. In the formation of such caps the molds are usually made of a composition which is plastic at the time the mold is formed, but subsequently becomes hard and quite brittle, and the composition of which the cap is composed is forced into the mold under considerable pressure, while economy of manufacture requires that the same molds be used repeatedly. The repeated use of the molds chips or breaks off the angular edges of the brittle molds, causing ragged and imperfect caps to be formed therein and materially shortening the life of the mold, while the pressure employed in making the cap is liable to split or disrupt the mold.

The object of the present invention is to provide a mold for making compo caps for mantels in which the material composing the mold is protected from injury, thereby enabling the mold to be handled rapidly and repeatedly without chipping the mold, to the end that the facility of handling the mold may be increased and its life greatly prolonged.

A further object is to provide a support for the mold, so that all danger of splitting or disrupting it under the pressure used in forming the compo cap therein may be avoided.

With these objects in view the invention consists of a mold composed of a plurality of sections, which sections are formed of suitable material within a box or casing, the box or casing having an opening or openings in its walls exactly corresponding in outline to the outline of the particular portion of the cap that is to be molded thereby. The box or casing may be of any suitable material; but preferably it is made of some metal, as brass, and the mold is or may be formed by stuffing the material therefor into the box in a plastic state until the box is filled and then firmly pressing that portion of the cap forming the pattern for that particular section into the material until the peripheral outline of the pattern enters and exactly coincides with the opening in the box. When the several sections of the mold have been thus formed, they are assembled into a complete mold, in which every portion or angular edge is completely protected against injury by the walls of the inclosing boxes or casings of the several sections.

My invention may be employed in the construction of any form of compo cap for mantels, and I have for the purpose of illustrating the invention shown it in the accompanying drawings as it is used in molding an Ionic compo cap; but it is to be expressly understood that the invention is not limited to the particular construction of cap shown.

In said drawings, Figure 1 is a perspective view, partly broken away, of a mold constructed according to my invention. Fig. 2 is a vertical cross-section thereof; and Fig. 3 is a perspective view, on a reduced scale, of a compo cap formed in said mold.

Referring to the drawings, 1 and 2 are boxes or casings containing molds of the end portions 3 and 4 of the cap, 5 is a box or casing containing a mold for that portion of the cap lying between the ends 3 and 4 and above the plane of the line 6, and 7 is a box or casing for that portion between the ends 3 and 4 and below the plane of the line 6. The general construction of each sectional mold, together with its inclosing box or casing, may be understood from a description of one of such sectional molds—the mold 1, for example. This is preferably formed by taking a hollow block or box 8, preferably of metal, and fitting it with a cover 9, having an opening formed therein exactly similar in peripheral outline to the outline or perimeter of the end 3 of the cap, as will be clearly understood by an inspection of Fig. 1. The material 10 of which the mold is to be formed, preferably a mixture of pitch and shellac, is then stuffed while in a plastic and preferably-heated condition into the cavity, and while the material is still plastic and hot the carved end 3 of the cap is inserted in this opening in the plate 9, which opening it exactly fits, and is firmly pressed into the material. After the plastic material has set and partially or fully cooled, the carved end of the cap is removed, and the mold 2 for the other end of the block is formed in an exactly similar manner. Only a broken fragment of this mold 2 is shown; but it is the same as mold 1, which is fully shown. The other sectional molds are formed in a similar manner—that is to say, by stuffing a suitably-shaped box or casing full of the hot plastic material and pressing the portion of the carved cap corresponding to the particular section through the outline opening in said box or casing. When the several sectional molds have been thus formed, they may be assembled into a complete mold, proper dowel-pins 11 and sockets or holes 12 being provided to insure the perfect registration of the several sections. Before the sectional mold 2 is put in position the compo material of which the molded block is to be formed is forced into the mold, which has been suitably oiled, after which the section 2 is placed thereon and forced down upon the plastic material until the face-plate 13 thereof meets or touches the face-plates 14 and 15 of the sectional molds 5 and 7. During the process of molding the compo cap the various sections of the mold may be clamped together in any suitable manner, as by a hoop or band encircling molds 5 and 7. During the operation of forming the compo cap in the mold and removing it therefrom the edges or corners of the material forming the mold proper are protected by the coverings or plates, and a large number of perfectly-accurate molded compo caps may thus be made from a single mold. A further advantage of inclosing the composition mold in a box or casing is that any desired degree of pressure may be employed in forming the caps in the mold without danger of disrupting the latter.

While I have shown the invention as applied in making an Ionic cap, it will readily be understood that the same inventive idea may be used in making a Corinthian or any other desired form of cap, and in my application Serial No. 54,652 I have shown, but not claimed, a sectional mold made up of four similar sections, each of which is constructed according to the invention herein described.

What I claim is—

1. A sectional mold the material of which has all its surfaces except the molding-surface inclosed in a box or casing.

2. A sectional mold formed in plastic material and having all its surfaces except the molding-surface inclosed in a box or casing.

3. A mold the substance forming which is inclosed in metal or other suitable material extending to the edges of the mold and conforming to the peripheral outline thereof, whereby the mold is protected from injury and is enabled to withstand high pressure.

4. A mold for "compo" caps for mantel and other columns, said mold having a plurality of sectional molds each inclosed in a box or casing which has an opening or openings thereinto exactly similar in peripheral outline to the peripheral outline of that portion of the said cap to which said sectional mold corresponds.

5. A mold for "compo" caps for mantel and other columns, having a section thereof inclosed in a box or casing through which there is an opening exactly similar in peripheral outline to the peripheral outline of that portion of the cap to which said section corresponds.

6. A sectional mold for making "compo" caps for mantel and other columns each section of which consists of a box or casing having an opening through a wall or walls thereof which opening is exactly similar in peripheral outline to the peripheral outline of that portion of the cap to which the given section corresponds.

7. A sectional mold entirely inclosed by a protecting box or casing except for an opening similar in peripheral outline to that section of the molded object to which said sectional mold corresponds.

In testimony whereof I have signed this specification in the presence of two subscribing witnesses.

EDGAR S. KENNEDY.

Witnesses:
REEVE LEWIS,
WM. B. KERKAM.